US012296958B2

(12) United States Patent
Dowty et al.

(10) Patent No.: US 12,296,958 B2
(45) Date of Patent: May 13, 2025

(54) PASSENGER SELECTABLE POWER MODE OPERATION FOR AIRCRAFT CABIN ENVIRONMENT (71) Applicant: B/E Aerospace, Inc., Winston-Salem, NC (US)

(72) Inventors: Mark B. Dowty, Rural Hall, NC (US); Wynn S. Parrish, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 250 days.

(21) Appl. No.: 18/083,219

(22) Filed: Dec. 16, 2022

(65) Prior Publication Data
US 2024/0199213 A1  Jun. 20, 2024

(51) Int. Cl.
B64D 11/06 (2006.01)
B64D 11/00 (2006.01)
H02J 13/00 (2006.01)

(52) U.S. Cl.
CPC ........ *B64D 11/06* (2013.01); *H02J 13/00001* (2020.01); *B64D 2011/0038* (2013.01); *B64D 2011/0053* (2013.01)

(58) Field of Classification Search
CPC ............ B64D 11/06; B64D 2011/0038; B64D 2011/0053; H02J 13/00001
See application file for complete search history.

(56) References Cited

U.S. PATENT DOCUMENTS

| 7,130,724 | B2 | 10/2006 | Petersen et al. |
| 9,840,330 | B2 | 12/2017 | Dueser |
| 9,896,216 | B2 * | 2/2018 | Linert .................... B64D 13/06 |
| 10,611,496 | B2 | 4/2020 | Sinusas et al. |
| 2005/0229226 | A1 | 10/2005 | Relan et al. |
| 2010/0145643 | A1 | 6/2010 | Katpelly et al. |
| 2011/0184579 | A1 | 7/2011 | Nilsen et al. |

(Continued)

FOREIGN PATENT DOCUMENTS

EP    2993772 A1    3/2016

OTHER PUBLICATIONS

European Search Report received in EP Application No. 23217730. 3, May 16, 2024, 8 pages.

Primary Examiner — Carlos Amaya
(74) Attorney, Agent, or Firm — Suiter Swantz IP (57) ABSTRACT A system and method for operating electronic equipment associated with a passenger seat and/or surrounding furniture in a vehicle cabin such as an aircraft cabin. According to a standard operating mode, electronic equipment is activated and/or operable without power consumption restrictions. According to a power saving operating mode, corresponding to an economy mode or a Sabbath mode, electronic equipment is inactivated and/or operable with power consumption restrictions. Operating mode selection may be via an interface unit associated with the passenger seat. In embodiments, power consumption statistics are calculated and displayed to the passenger to indicate an economy score for a flight. In embodiments, selecting power saving mode may cause the electronic equipment to perform differently during higher aircraft power demand periods as compared to lower aircraft power demand periods.

20 Claims, 3 Drawing Sheets (56) References Cited

U.S. PATENT DOCUMENTS

| | | | |
|---|---|---|---|
| 2013/0185662 A1* | 7/2013 | Quattrocolo | B60K 35/22 |
| | | | 715/764 |
| 2016/0072293 A1* | 3/2016 | Jouper | H02J 4/00 |
| | | | 307/9.1 |
| 2016/0249073 A1 | 8/2016 | Margis et al. | |
| 2018/0276768 A1* | 9/2018 | Mori | G06Q 50/06 |
| 2020/0348744 A1 | 11/2020 | Rabii et al. | |
| 2021/0344215 A1 | 11/2021 | Prabhu et al. | |
| 2023/0049286 A1* | 2/2023 | Otaka | H04W 4/40 |

* cited by examiner

PASSENGER SELECTABLE POWER MODE OPERATION FOR AIRCRAFT CABIN ENVIRONMENT

TECHNICAL FIELD AND BACKGROUND

The present disclosure relates generally to power consumption in a vehicle such as an aircraft, and more particularly to selectable power mode operations for electronic equipment in a vehicle environment such as an aircraft passenger cabin.

Aircraft and other conveyances typically include electronic equipment for the use and enjoyment of passengers. Electronic equipment may include media devices, lighting, seat adjustment mechanisms, seat climatization systems, device chargers, etc. Such electronic equipment may be controllable by the passengers and by the airline.

In aircraft, for example, power is generated through auxiliary power units (APUs) configured to draw energy away from the primary engines. Some aircraft may also utilize batteries as auxiliary power sources. As passenger power needs grow, additional demands are placed on the vehicle power system. In aircraft, larger power requirements correlate with greater fuel burn.

As the traveling passenger becomes more energy conscious, it would be desirable to implement controllable aspects for the various electronic equipment available to the passenger. More specifically, it would be desirable to implement selectable economy modes for low power operation of the various electronic equipment usable by the passengers.

BRIEF SUMMARY

According to a first aspect, the present disclosure provides a system for selectable power mode operation of electronic equipment in a passenger cabin environment, for instance an aircraft passenger cabin. The system includes electronic equipment associated with a passenger seat and/or surrounding furniture in a passenger cabin, the electronic equipment for use by a passenger, a controller operably coupled to the electronic equipment, the controller configured to operate the electronic equipment in one of a standard operating mode and a power saving operating mode, and an interface unit communicatively coupled to the controller, the interface unit located in at least one of the passenger seat and the surrounding furniture, the interface unit including a display, and the interface unit operable to instruct the controller, based on selection input by the passenger, to operate the electronic equipment in one of the standard operating mode and the power saving operating mode.

In some embodiments, the passenger cabin is in an aircraft, aircraft performance includes higher aircraft power demand periods and lower aircraft power demand periods, when the electronic equipment is operated in the standard operating mode, performance of the electronic equipment is the same during each of the higher aircraft power demand periods and lower aircraft power demand periods, and when the electronic equipment is operated in the power saving operating mode, performance of the electronic equipment is reduced during the higher aircraft power demand periods as compared to the lower aircraft power demand periods.

In some embodiments, performance of the electronic equipment includes at least one of the ability to power on the electronic equipment, power draw of the electronic equipment, and available functions of the electronic equipment.

In some embodiments, the controller is configured to determine a power usage of the electronic equipment operating in each of the standard operating mode and the power saving operating mode of the electronic equipment, the controller is further configured to calculate a difference between the determined power usages and communicate at least one of the determined power usages and the calculated difference between the determined power usages to the interface unit, and the interface unit is configured to display to the passenger, via the display, at least one of the determined power usages and the calculated difference between the power usages.

In some embodiments, when the electronic equipment is operated in the power saving operating mode, the controller is configured to determine a power usage of the electronic equipment operated in the power saving operating mode and calculate a difference between the determined power usage of the electronic equipment operated in the power saving operating mode and a known power usage of the electronic equipment operated in the standard operating mode, the controller is further configured to communicate the calculated difference to the interface unit, and the interface unit is configured to display the calculated difference, via the display, as at least one of a percentage and a graphic.

In some embodiments, the electronic equipment includes a plurality of seat actuators configured to adjust at least one seat element of the passenger seat, when the standard operating mode of the electronic equipment is selected, the controller is configured to activate the plurality of seat actuators simultaneously to adjust the at least one seat element, and when the power saving operating mode of the electronic equipment is selected, the controller is configured to activate the plurality of seat actuators sequentially to adjust the at least one seat element.

In some embodiments, the electronic equipment includes at least one seat actuator configured to adjust at least one seat element of the passenger seat, when the standard operating mode of the electronic equipment is selected, the controller is configured to actuate the at least one seat actuator at a first actuation speed, and when the power saving operating mode of the electronic equipment is selected, the controller is configured to actuate the at least one seat actuator at a second actuation speed slower than the first actuation speed.

In some embodiments, the electronic equipment includes mood lighting and task lighting associated with the passenger seat and/or surrounding furniture, when the standard operating mode of the electronic equipment is selected, the controller is configured to activate the mood lighting and allow the task lighting to be operated up to a maximum luminosity, and when the power saving operating mode of the electronic equipment is selected, the controller is configured to inactivate the mood lighting and allow the task lighting to be operated up to a reduced luminosity less than the maximum luminosity.

In some embodiments, the passenger cabin is located in an aircraft, the electronic equipment includes at least one of a seat actuator, a lighting device, a video monitor, a charging device, and a seat climatization device, when the standard operating mode of the electronic equipment is selected the controller is configured to supply maximum power to the electronic equipment, when the power saving operating mode of the electronic device is selected the controller is configured to supply reduced power to the electronic equipment, and the power saving mode causes the electronic equipment to perform differently during each of higher aircraft power demand periods and lower aircraft power demand periods.

In some embodiments, the interface unit is located in or incorporated into an electronic passenger control unit associated with the passenger seat and/or surrounding furniture, and wherein the system further includes an indicator associated with the passenger seat and/or surrounding furniture configured to display an energy performance score, the indicator visible to at least one of the passenger and surrounding passengers in the passenger cabin environment.

According to another aspect, the present disclosure provides a method for operating electronic equipment in a passenger cabin of an aircraft. The method includes providing electronic equipment in an aircraft, the electronic equipment associated with a passenger seat and/or surrounding furniture, and the electronic equipment for use by a passenger, providing a controller operably coupled to the electronic equipment, and providing an interface unit associated with the passenger seat and/or the surrounding furniture, the interface unit communicatively coupled to the controller, and the interface unit including a display. The method further includes displaying each of a standard operating mode of the electronic equipment and a power saving operating mode of the electronic equipment on the interface unit, selecting, via the interface unit, the standard operating mode of the electronic equipment to operate the electronic equipment without power consumption restrictions, and selecting, via the interface unit, the power saving operating mode of the electronic equipment to operate the electronic equipment with power consumption restrictions.

In some embodiments, at a conclusion of a flight of the aircraft, the controller is configured to determine a power usage of the electronic equipment operated in each of the standard operating mode and the power saving operating mode of the electronic equipment, the controller is further configured to calculate a difference between the determined power usages and communicate at least one of the determined power usages and the calculated difference between the determined power usages to the interface unit, and the interface unit is configured to display to the passenger, via the display, at least one of the determined power usages and the calculated difference between the power usages.

In some embodiments, the electronic equipment includes a plurality of seat actuators configured to adjust at least one seat element of the passenger seat, when the standard operating mode of the electronic equipment is selected, the controller is configured to activate the plurality of seat actuators simultaneously and/or at a first actuation speed, when the power saving operating mode of the electronic equipment is selected, the controller is configured to activate the plurality of seat actuators sequentially and/or at a second actuation speed slower than the first actuation speed.

In some embodiments, the electronic equipment includes mood lighting and task lighting, when the standard operating mode of the electronic equipment is selected, the controller is configured to activate the mood lighting and allow the task lighting to be operated up to a maximum luminosity, and when the power saving operating mode of the electronic equipment is selected, the controller is configured to inactivate the mood lighting and allow the task lighting to be operated up to a reduced luminosity less than the maximum luminosity.

In some embodiments, the electronic equipment includes at least one of a seat actuator, a lighting device, a video monitor, a charging device, and a seat climatization device, aircraft performance includes higher aircraft power demand periods and lower aircraft power demand periods, when the electronic equipment is operated in the standard operating mode performance of the electronic equipment is the same during each of the higher aircraft power demand periods and lower aircraft power demand periods, and when the electronic equipment is operated in the power saving operating mode performance of the electronic equipment is reduced during the higher aircraft power demand periods as compared to the lower aircraft power demand periods.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings. Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides systems and method for operating electronic equipment in an environment such as an aircraft passenger cabin. The electronic equipment is operable in at least two power modes, wherein a first mode corresponds to a standard operating mode without power restrictions and the second mode corresponds to a power saving or "economy" operating mode with power restrictions. In the first operating mode, the electronic equipment may be activated, operable up to maximum levels, and/or operable with maximum available functionality. In the second operating mode, the electronic equipment be inactive and/or operable up to reduced levels and/or with reduced functionalities, for instance slower speeds, lower power, less intensity, according to a predetermined sequence, etc. In some embodiments, the power saving operating mode corresponds to a Sabbath mode allowing basic uses of the electronic equipment as necessary for conveying information, safety, etc.

The modes are selectable by a passenger and or crew, such as an aircraft cabin crew. Selections may be input via an interface unit communicatively coupled to a controller configured to operate the electronic equipment according to the selected mode. The controller may be further operable for determining power usage of the electronic equipment in each of the operating modes, reporting the same to the passenger via the interface unit, and calculating and displaying an energy savings, for instance at the conclusion of a flight. The energy savings may be expressed as a percentage and/or a graphic corresponding to an economy score.

Figure 1:
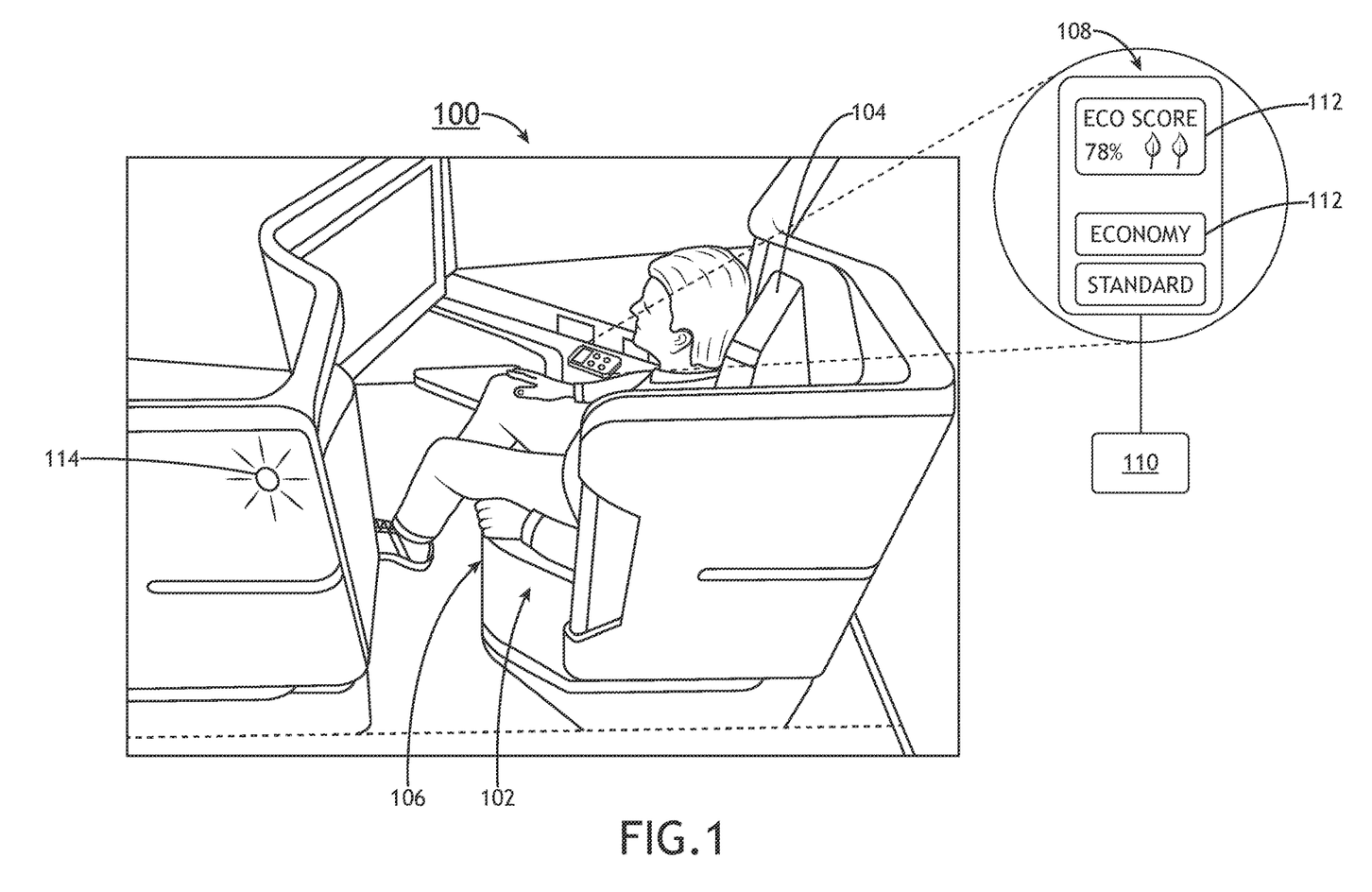
FIG. 1 illustrates an aircraft passenger cabin including a system for selectable power mode operation for electronic equipment according to an embodiment of the present disclosure.

FIG. 1 illustrates an environment in which the systems and methods according to the present disclosure may be implemented. For example, the environment may be an aircraft passenger cabin that includes passenger seats and surrounding furniture and electronic equipment associated with the passenger seats and/or surrounding furniture. The electronic equipment may be positioned internal to the seat and/or furniture, external to the seat and/or furniture, proximal to the seat and/or furniture, etc. The electronic equipment is provided for the use and enjoyment of the passenger while on board the aircraft.

The electronic equipment may include, but is not limited to, seat actuation systems including seat actuators, seat climatization systems including heating, cooling and ventilation functions, seat massage systems and lumbar support, audio systems, video systems including display devices, task lighting, ambient lighting, and fragrance dispensers, among others. In some embodiments, the electronic equipment may be set to an active state or in an inactive state. For example, in the case of ambient or mood lighting, the active state may correspond to powering on the mood lighting and the inactive state may correspond to powering off the mood lighting. In some embodiments, the electronic equipment may be controllable in terms of at least one of luminosity, time powered on, intensity, power level, speed, volume, etc. For example, in the case of media and video monitors, the video monitor may be controllable in terms of brightness and types of media displayed. Video monitors may also be set to an active state where the monitor is turned on, and inactive state where the monitor is turned off, and a restricted active state where the monitor is turned on only to display critical information such as safety procedures.

In use, at the beginning of a flight or during a flight, a passenger may select between the standard and power saving operating modes of the electronic equipment. Selecting the standard mode allows operation of the electronic equipment associated with the seat without power and use restrictions, whereas selecting the power saving operating mode allows use of the same electronic equipment associated with the seat with limited power and use restrictions, and in some cases with no use of the electronic equipment. For example, in a power saving mode or Sabbath mode, non-essential electronic devices may be made inactive and/or some functions of an electronic device may be made inactive. For example, in the case of a video monitor, selecting the power saving mode may make the display of all entertainment media inactive whereas safety procedures and critical message displays may remain active. In some embodiments, electronic equipment may be made active only during taxi, takeoff, and landing (TTOL) as required and may be made inactive during flight when not required.

As shown in FIG. 1, the aircraft passenger cabin 100 includes a passenger seat 102 such as a premium class passenger seat equipped with seat elements capable of electronic adjustment. For example, the passenger seat 102 may include a backrest 104 configured to recline and a leg rest 106 configured to extend. In some embodiments, the backrest 104 reclines and the leg rest 106 extends to form a flat bed. For example, during standard operating mode of the seat, a backrest actuator and a separate leg rest actuator associated with the seat, such as internal to the seat, may be actuated simultaneously to adjust the seat from the upright sitting position to a flat bed. In the power saving operating mode, the backrest actuator and the leg rest actuator may be actuated sequentially to reduce the power draw of the seat actuation system, i.e., only one actuator drawing power at a time. In some embodiments, the standard operating mode may correspond to a first actuation speed of the two actuators and the power saving operating mode may correspond to a second actuation speed of the two actuators that is slower than the first actuation speed. In some embodiments, the power saving mode corresponds to both sequential actuation and slower actuation speed. In some embodiments, actuation in the power saving mode may be according to a predetermined actuation sequence.

Known to those skill in the art of aircraft passenger seats and aircraft seating arrangements, electromechanical actuation systems may include line replaceable units (LRUs) and other control units for controlling seats, privacy panels, entertainment components, lighting, comfort components, etc. Electrical connections between the LRUs and controlled components may include 2-wire power cable connections, bundled power and data cable connections, and data only cable connections. Wireless connections are also known. The LRUs can include actuators which may be electromechanical actuators for automated mechanical components, such as seat, armrest, and privacy panel components. Lighting actuator LRUs may be provided to control lights in the seating area in response to a passenger input received at an input/output module (IOM) via an in-flight entertainment (IFE) module, which may be the interface unit implemented as a touchscreen or other input device. Comfort components may include actuators such as air pumps for controlling an amount of air supplied to a pneumatic bladder system that provides seat back lumbar support in response to a passenger input at the IOM.

With continued reference to FIG. 1, the system for selecting a particular power mode further includes an interface unit 108 communicatively coupled to a controller 110. The controller 110 may be integral to the interface unit 108 or separate therefrom, such as positioned elsewhere in the seating environment or remote. As discussed above, the interface unit 108 may be a touch-sensitive device. In some embodiments, the interface unit 108 is incorporated into a passenger control unit or the seat video monitor. As shown, the interface unit 108 is positioned in the seating environment separate from the video monitor. For example, the interface unit 108 may be positioned in a seat element such as an armrest or positioned in surrounding furniture such as a console. The interface unit 108 generally includes at least one display 112, such as a touch responsive display, configured to input a power mode selection from the passenger and output the power mode selection to the controller 110. As shown, the at least one display 112 displays the power mode choices, i.e., standard operating mode and power saving or "economy" mode.

The at least one display 112 is further configured to display power usage statistics determined by the controller 110. Power usage statistics may be displayed as actual amounts of power used or symbolically as graphical elements. For example, graphical elements may be symbols. In a particular example, the graphical elements may be green leaves, wherein green is the color commonly associated with energy-efficiency. A greater number of green leaves may indicate a higher economy score. The controller 110 may be further configured to determine power usage of the electronic equipment in standard operating mode, determine the power usage of the electronic equipment in power saving operating mode, and calculate the difference between the determined power usages and display the same as a power savings and/or economy score. In some embodiments, the system may include a separate indicator, for instance a public indicator 114, positioned in a location visible to the passenger and/or surrounding passengers. In use, the public indicator may display an energy score to the surrounding passengers. For example, the indicator may show a green light to indicate that the passenger associated with the separate indicator achieved a good energy score.

In some applications, upon boarding the aircraft the passenger may first initially select the power saving operating mode before using any of the electronic equipment. In that case, the controller 110 may be configured to determine the power usage during the flight and calculate the energy score according to historical data for the electronic equipment operated in standard mode. In some embodiments, the data calculation may exclude power modes that the passenger has no control over, such as pathway lighting and safety procedure displays.

In some embodiments, electronic equipment control includes powering on or powering off certain electronic equipment. For example, with regarding to lighting equipment including task lighting and mood lighting, the standard operating mode may include allowing maximum luminosity of the task lighting and powering on the mood lighting, whereas the power saving operating mode may include reducing the maximum allowable intensity of the task lighting while powering off the mood lighting. In some embodiments, activating the power saving operating mode may cause the mood lighting to remain on in preparation for and during TTOL and cause the mood lighting to power off during flight.

In some embodiments, the electronic equipment may include seat climatization systems configured to at least of heat, cool and ventilate a seat. The standard mode of the seat climatization mode may include full functionality such as at least one of full heating, cooling, and ventilation functions. The power saving operating mode of the seat climatization system may include deactivating the system entirely, limiting maximum or minimum achievable temperatures, limiting the system to ventilation functionality only, etc. Other electronic equipment configured to operate in of the two operating modes includes device chargers.

In some embodiments, the power saving operating mode enables a timed power option. For example, the timed power option may deactivate the electronic equipment after a predetermined time period, such as limiting the amount of time a video monitor can be used. In another example, the timed power option may reduce power consumption during peak power times also referred to as higher aircraft power demand periods, for instance during TTOL. During TTOL, when the power system of the aircraft is most stressed, enabling the power saving operating mode may deactivate certain electronic equipment or reduce power draw for certain electronic equipment. During lower aircraft power demand periods, for instance when cruising at altitude, the electronic equipment may allow unrestricted use of the electronic equipment. Thus, in some embodiments, when the power saving mode is selected the electronic equipment performs differently during the higher aircraft power demand periods as compared to the lower aircraft power demand periods.

Figure 2:
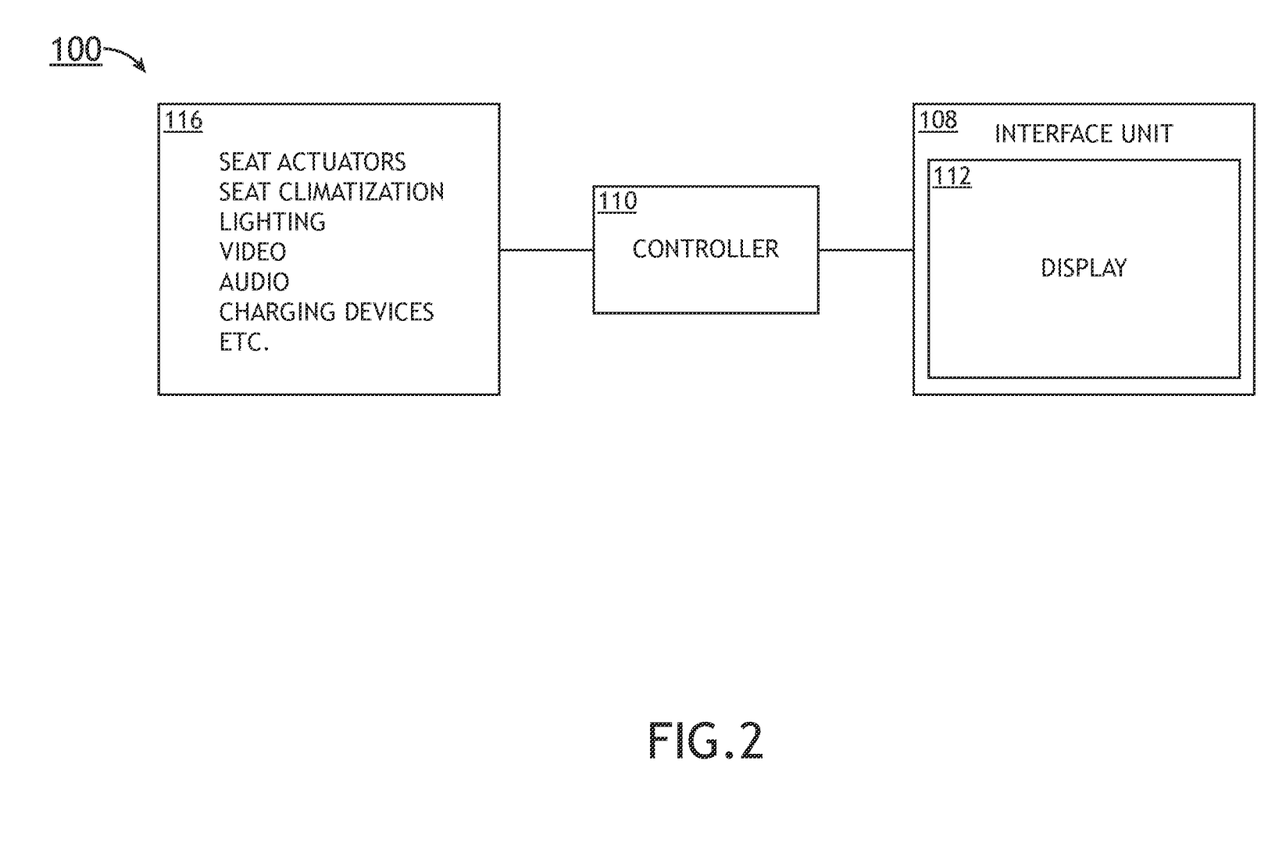
FIG. 2 illustrates schematically a system for selectable power mode operation for electronic equipment according to an embodiment of the present disclosure.

FIG. 2 diagrammatically illustrates the system 100 according to the present disclosure. The system 100 generally includes the various controllable electronic equipment 116 communicatively coupled to the controller 110. The system further includes the interface unit 108 including the at least one display 112. The at least one display 112 may include any type of display device known in the art. For example, the display may include a liquid crystal display (LCD), a light-emitting diode (LED) based display, an organic light-emitting diode (OLED) based display, etc. The particular choice of display device may depend on a variety of factors such as form factor and cost. In some embodiments, the interface unit 108 may include a display that is part of, or incorporated into the in-flight entertainment monitor. The interface unit 108 may be communicatively coupled to the controller 110 in any manner known in the art. For example, one or more processors of the devices may be communicatively coupled to each other and other components of the system via a wireline or wireless connection. The one or more processors may include any type of processing elements such as integrated circuits, e.g., application specific integrated circuits (ASIC) and field programmable gate arrays (FPGA). The interface unit 108 may be configured to communicate with components of the system. For example, the interface unit 108 may be configured to retrieve data from the controller 110 or other devices, transmit data for storage in memory, retrieve data from storage in memory, etc. The interface unit 108 may be communicatively coupled with the controller 110 to facilitate data transfer between components of the system and the controller 110. The memory may be tangible, computer-readable storage medium that provides storage functionality to store various data and/or program code associated with operation of the system and/or controller 110, such as software programs and/or code segments, or other data to instruct the controller 110, and possibly other components of the system, to perform the functionalities described herein.

Figure 3:
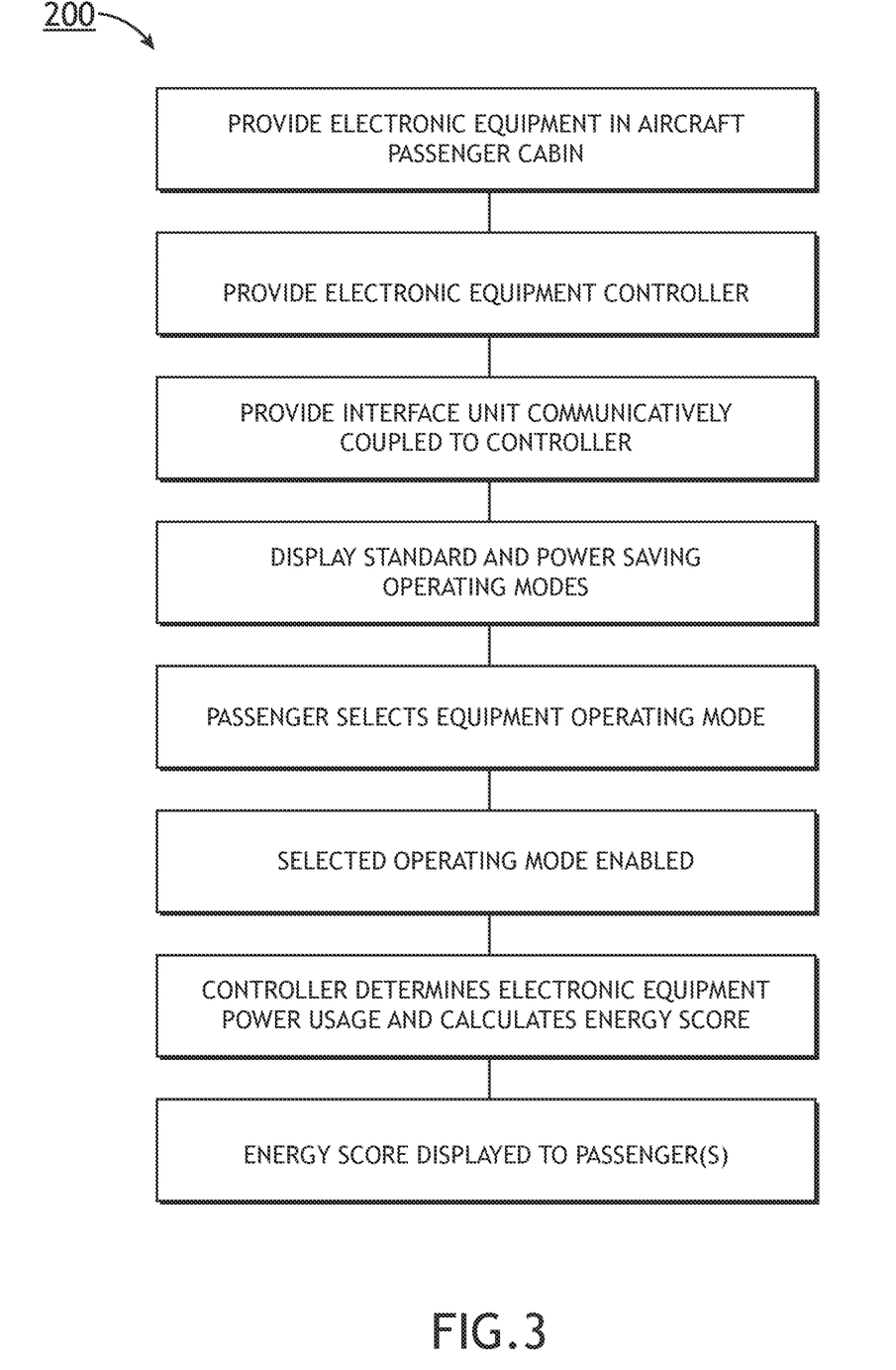
FIG. 3 is a flow diagram illustrating a method for selectable power mode operation for electronic equipment according to an embodiment of the present disclosure.

FIG. 3 is a flowchart illustrating a method for operating electronic equipment in a passenger cabin of an aircraft. The method 200 includes providing electronic equipment in an aircraft, the electronic equipment associated with a passenger seat and the electronic equipment for use or enjoyment by a passenger. The electronic equipment may include any of the electronic equipment described above. The method further includes providing a controller in the aircraft, as discussed above, operably coupled to the electronic equipment. The method further includes providing an interface unit, as discussed above, associated with the passenger seat, the interface unit communicatively coupled to the controller, and the interface unit including a display.

The method 200 continues with displaying, via the display, the options for operating the electronic equipment in a standard operating mode of the electronic equipment or a power saving operating mode of the electronic equipment. The passenger has the option to select from one of the two operating modes. In some embodiments, failure to select an operating mode enables the standard operating mode as the default setting. The method continues with the passenger selecting, via the interface unit, either the standard operating mode of the electronic equipment to operate the electronic equipment without power consumption restrictions, or the power saving operating mode of the electronic equipment to operate the electronic equipment with any of the power consumption, sequence, speed, luminosity, and timed restrictions discussed above. The active mode of operation is indicated on the display.

At the conclusion of the flight, or on demand, assuming the power saving mode has been enabled, the controller determines the power usage of the electronic equipment operated in the power saving operating mode, and from the determined usage as compared to usage in the standard mode, calculates a difference between the usages to produce an energy score. The energy score, as discussed above, is displayed to the passenger via the display.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for selectable power mode operation of electronic equipment in a passenger cabin environment, comprising:
   electronic equipment associated with a passenger seat in a passenger cabin, the electronic equipment for use by a passenger;
   a controller operably coupled to the electronic equipment, the controller configured to operate the electronic equipment in one of a standard operating mode and a power saving operating mode; and
   an interface unit communicatively coupled to the controller, the interface unit located in at least one of the passenger seat and the surrounding furniture, the interface unit including a display, and the interface unit operable to instruct the controller, based on selection input by the passenger, to operate the electronic equipment in one of the standard operating mode and the power saving operating mode;
   wherein:
   the electronic equipment comprises a plurality of seat actuators configured to adjust at least one seat element of the passenger seat;
   when the standard operating mode of the electronic equipment is selected, the controller is configured to activate the plurality of seat actuators simultaneously to adjust the at least one seat element; and
   when the power saving operating mode of the electronic equipment is selected, the controller is configured to activate the plurality of seat actuators sequentially to adjust the at least one seat element.

2. The system according to claim 1, wherein:
   the passenger cabin is in an aircraft;
   aircraft performance includes higher aircraft power demand periods and lower aircraft power demand periods;
   when the electronic equipment is operated in the standard operating mode, performance of the electronic equipment is the same during each of the higher aircraft power demand periods and lower aircraft power demand periods; and
   when the electronic equipment is operated in the power saving operating mode, performance of the electronic equipment is reduced during the higher aircraft power demand periods as compared to the lower aircraft power demand periods.

3. The system according to claim 2, wherein performance of the electronic equipment includes at least one of an ability to power on the electronic equipment, power draw of the electronic equipment, and available functions of the electronic equipment.

4. The system according to claim 1, wherein:
   the controller is configured to determine a power usage of the electronic equipment operating in each of the standard operating mode and the power saving operating mode of the electronic equipment;
   the controller is further configured to calculate a difference between the determined power usages and communicate at least one of the determined power usages and the calculated difference between the determined power usages to the interface unit; and
   the interface unit is configured to display to the passenger, via the display, at least one of the determined power usages and the calculated difference between the power usages.

5. The system according to claim 1, wherein when the electronic equipment is operated in the power saving operating mode:
   the controller is configured to determine a power usage of the electronic equipment operated in the power saving operating mode and calculate a difference between the determined power usage of the electronic equipment operated in the power saving operating mode and a known power usage of the electronic equipment operated in the standard operating mode;
   the controller is further configured to communicate the calculated difference to the interface unit; and
   the interface unit is configured to display the calculated difference, via the display, as at least one of a percentage and a graphic.

6. The system according to claim 1, wherein:
the electronic equipment further comprises mood lighting and task lighting associated with the passenger seat;
when the standard operating mode of the electronic equipment is selected, the controller is configured to activate the mood lighting and allow the task lighting to be operated up to a maximum luminosity; and
when the power saving operating mode of the electronic equipment is selected, the controller is configured to inactivate the mood lighting and allow the task lighting to be operated up to a reduced luminosity less than the maximum luminosity.

7. The system according to claim 1, wherein:
the passenger cabin is located in an aircraft;
when the standard operating mode of the electronic equipment is selected, the controller is configured to supply maximum power to the electronic equipment;
when the power saving operating mode of the electronic device is selected, the controller is configured to supply reduced power to the electronic equipment; and
the power saving mode causes the electronic equipment to perform differently during higher aircraft power demand periods as compared to lower aircraft power demand periods.

8. The system according to claim 1, wherein the interface unit is located in or incorporated into an electronic passenger control unit associated with the passenger seat, and wherein the system further includes an indicator associated with the passenger seat configured to display an energy performance score, the indicator visible to at least one of the passenger and surrounding passengers in the passenger cabin environment.

9. A method for operating electronic equipment in a passenger cabin of an aircraft, comprising:
providing electronic equipment in an aircraft, the electronic equipment associated with a passenger seat, and the electronic equipment for use by a passenger;
providing a controller operably coupled to the electronic equipment; and
providing an interface unit associated with the passenger seat, the interface unit communicatively coupled to the controller, and the interface unit including a display;
displaying each of a standard operating mode of the electronic equipment and a power saving operating mode of the electronic equipment on the interface unit;
selecting, via the interface unit, the standard operating mode of the electronic equipment to operate the electronic equipment without power consumption restrictions; and
selecting, via the interface unit, the power saving operating mode of the electronic equipment to operate the electronic equipment with power consumption restrictions;
wherein:
the electronic equipment comprises a plurality of seat actuators configured to adjust at least one seat element of the passenger seat:
when the standard operating mode of the electronic equipment is selected, the controller is configured to activate the plurality of seat actuators simultaneously and/or at a first actuation speed; and
when the power saving operating mode of the electronic equipment is selected, the controller is configured to activate the plurality of seat actuators sequentially and/or at a second actuation speed slower than the first actuation speed.

10. The method according to claim 9, wherein at a conclusion of a flight of the aircraft:
the controller is configured to determine a power usage of the electronic equipment operated in each of the standard operating mode and the power saving operating mode of the electronic equipment;
the controller is further configured to calculate a difference between the determined power usages and communicate at least one of the determined power usages and the calculated difference between the determined power usages to the interface unit; and
the interface unit is configured to display to the passenger, via the display, at least one of the determined power usages and the calculated difference between the power usages.

11. The method according to claim 9, wherein:
the electronic equipment further comprises mood lighting and task lighting;
when the standard operating mode of the electronic equipment is selected, the controller is configured to activate the mood lighting and allow the task lighting to be operated up to a maximum luminosity; and
when the power saving operating mode of the electronic equipment is selected, the controller is configured to inactivate the mood lighting and allow the task lighting to be operated up to a reduced luminosity less than the maximum luminosity.

12. The method according to claim 8, wherein:
aircraft performance includes higher aircraft power demand periods and lower aircraft power demand periods;
when the electronic equipment is operated in the standard operating mode, performance of the electronic equipment is the same during each of the higher aircraft power demand periods and lower aircraft power demand periods; and
when the electronic equipment is operated in the power saving operating mode, performance of the electronic equipment is reduced during the higher aircraft power demand periods as compared to the lower aircraft power demand periods.

13. A system for selectable power mode operation of electronic equipment in a passenger cabin environment, comprising:
electronic equipment associated with a passenger seat, the electronic equipment for use by a passenger;
a controller operably coupled to the electronic equipment, the controller configured to operate the electronic equipment in one of a standard operating mode and a power saving operating mode; and
an interface unit communicatively coupled to the controller, the interface unit located in at least one of the passenger seat and the surrounding furniture, the interface unit including a display, and the interface unit operable to instruct the controller, based on selection input by the passenger, to operate the electronic equipment in one of the standard operating mode and the power saving operating mode;
wherein:
the electronic equipment comprises at least one seat actuator configured to adjust at least one seat element of the passenger seat;
when the standard operating mode of the electronic equipment is selected, the controller is configured to actuate the at least one seat actuator at a first actuation speed; and when the power saving operating mode of the electronic equipment is selected, the controller is configured to actuate the at least one seat actuator at a second actuation speed slower than the first actuation speed.

14. The system according to claim 13, wherein:
the passenger cabin is in an aircraft;
aircraft performance includes higher aircraft power demand periods and lower aircraft power demand periods;
when the electronic equipment is operated in the standard operating mode, performance of the electronic equipment is the same during each of the higher aircraft power demand periods and lower aircraft power demand periods; and
when the electronic equipment is operated in the power saving operating mode, performance of the electronic equipment is reduced during the higher aircraft power demand periods as compared to the lower aircraft power demand periods.

15. The system according to claim 14, wherein performance of the electronic equipment includes at least one of an ability to power on the electronic equipment, power draw of the electronic equipment, and available functions of the electronic equipment.

16. The system according to claim 13, wherein:
the controller is configured to determine a power usage of the electronic equipment operating in each of the standard operating mode and the power saving operating mode of the electronic equipment;
the controller is further configured to calculate a difference between the determined power usages and communicate at least one of the determined power usages and the calculated difference between the determined power usages to the interface unit; and
the interface unit is configured to display to the passenger, via the display, at least one of the determined power usages and the calculated difference between the power usages.

17. The system according to claim 13, wherein when the electronic equipment is operated in the power saving operating mode:
the controller is configured to determine a power usage of the electronic equipment operated in the power saving operating mode and calculate a difference between the determined power usage of the electronic equipment operated in the power saving operating mode and a known power usage of the electronic equipment operated in the standard operating mode;
the controller is further configured to communicate the calculated difference to the interface unit; and
the interface unit is configured to display the calculated difference, via the display, as at least one of a percentage and a graphic.

18. The system according to claim 13, wherein:
the electronic equipment further comprises mood lighting and task lighting associated with the passenger seat;
when the standard operating mode of the electronic equipment is selected, the controller is configured to activate the mood lighting and allow the task lighting to be operated up to a maximum luminosity; and
when the power saving operating mode of the electronic equipment is selected, the controller is configured to inactivate the mood lighting and allow the task lighting to be operated up to a reduced luminosity less than the maximum luminosity.

19. The system according to claim 13, wherein:
the passenger cabin is located in an aircraft;
when the standard operating mode of the electronic equipment is selected, the controller is configured to supply maximum power to the electronic equipment;
when the power saving operating mode of the electronic device is selected, the controller is configured to supply reduced power to the electronic equipment; and
the power saving mode causes the electronic equipment to perform differently during higher aircraft power demand periods as compared to lower aircraft power demand periods.

20. The system according to claim 13, wherein the interface unit is located in or incorporated into an electronic passenger control unit associated with the passenger seat, and wherein the system further includes an indicator associated with the passenger seat configured to display an energy performance score, the indicator visible to at least one of the passenger and surrounding passengers in the passenger cabin environment.

* * * * *